(12) United States Patent  
Gopalan et al.

(10) Patent No.: US 11,218,758 B2  
(45) Date of Patent: *Jan. 4, 2022

(54) DIRECTING USER FOCUS IN 360 VIDEO CONSUMPTION

(71) Applicant: AT&T Intellectual Property I, L.P., Atlanta, GA (US)

(72) Inventors: Raghuraman Gopalan, Dublin, CA (US); Zhu Liu, Marlboro, NJ (US); Behzad Shahraray, Holmdel, NJ (US); Eric Zavesky, Austin, TX (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/901,423

(22) Filed: Jun. 15, 2020

(65) Prior Publication Data

US 2020/0314473 A1  Oct. 1, 2020

Related U.S. Application Data

(63) Continuation of application No. 15/982,300, filed on May 17, 2018, now Pat. No. 10,721,510.

(51) Int. Cl.
*H04N 21/258* (2011.01)
*H04N 21/462* (2011.01)
(Continued)

(52) U.S. Cl.
CPC ... *H04N 21/25891* (2013.01); *H04N 21/4622* (2013.01); *H04N 5/23238* (2013.01); *H04N 21/812* (2013.01); *H04N 21/816* (2013.01)

(58) Field of Classification Search
CPC ......... H04N 21/25891; H04N 21/4622; H04N 21/812; H04N 5/23238; H04N 21/816;
(Continued)

(56) References Cited

U.S. PATENT DOCUMENTS

| 7,224,382 B2 | 5/2007 | Baker |
| 8,462,010 B2 | 6/2013 | Chi et al. |

(Continued)

FOREIGN PATENT DOCUMENTS

| EP | 3155560 A1 | 4/2017 |
| WO | 2017036953 A1 | 3/2017 |

(Continued)

OTHER PUBLICATIONS

Argyriou, L. et al., "Engaging immersive video consumers: Challenges regarding 360-degree gamified video applications", Westminster-Research http://www.westminster.ac.uk/westminsterresearch, 2016, 10 pages.

(Continued)

*Primary Examiner* — Anthony Bantamoi
(74) *Attorney, Agent, or Firm* — Guntin & Gust, PLC; Douglas Schnabel

(57) ABSTRACT

Aspects of the subject disclosure may include, for example, a method including obtaining media content and an identification of a plurality of points of interest in the media content, receiving a request from a user to view the media content, obtaining information about the user, identifying one or more highlight and/or degrade points based on the information about the user, modifying the media content to create highlighted content, the highlighted content being the media content modified to attract attention of the user to the highlight point and drive the attention of the user away from the degrade point, presenting the highlighted content to the user, and monitoring the user's consumption of the content. Other embodiments are disclosed.

19 Claims, 8 Drawing Sheets

(51) Int. Cl.
*H04N 21/81* (2011.01)
*H04N 5/232* (2006.01)

(58) Field of Classification Search
CPC ......... H04N 21/4542; H04N 21/45455; H04N 21/44218; H04N 21/440263; H04N 21/440245; H04N 21/4402; H04N 21/4532; H04N 21/21805; H04N 21/23418; H04N 21/2343; H04N 21/234345; H04N 21/234363
See application file for complete search history.

(56) References Cited

U.S. PATENT DOCUMENTS

| | | | |
|---|---|---|---|
| 8,471,783 B2 | 6/2013 | Rhodes et al. | |
| 8,542,232 B2 | 9/2013 | Sauriol et al. | |
| 8,584,044 B2 | 11/2013 | Wong | |
| 8,760,566 B2 | 6/2014 | Pitts et al. | |
| 9,087,131 B1* | 7/2015 | Gundotra | G06F 17/30864 |
| 9,363,569 B1 | 6/2016 | Christensen et al. | |
| 9,429,752 B2 | 8/2016 | Schowengerdt et al. | |
| 9,686,520 B2 | 6/2017 | Degtyarev et al. | |
| 9,690,099 B2 | 6/2017 | Bar-Zeev et al. | |
| 9,690,371 B2 | 6/2017 | Saito | |
| 9,710,973 B2 | 7/2017 | Bar-Zeev et al. | |
| 9,720,241 B2 | 8/2017 | Osterhout et al. | |
| 9,729,850 B2 | 8/2017 | Medina et al. | |
| 9,743,060 B1 | 8/2017 | Matias et al. | |
| 9,774,887 B1 | 9/2017 | Walkingshaw et al. | |
| 9,782,678 B2 | 10/2017 | Liu et al. | |
| 9,830,513 B2 | 11/2017 | Olsson et al. | |
| 9,836,889 B2 | 12/2017 | Vaught et al. | |
| 9,881,420 B2 | 1/2018 | Miller et al. | |
| 9,904,055 B2 | 2/2018 | Burns et al. | |
| 9,911,238 B2 | 3/2018 | Doronichev | |
| 9,922,462 B2 | 3/2018 | Miller | |
| 9,928,655 B1 | 3/2018 | Alston | |
| 10,827,225 B2 | 11/2020 | Han et al. | |
| 2003/0220971 A1 | 11/2003 | Kressin et al. | |
| 2012/0042282 A1 | 2/2012 | Wong et al. | |
| 2013/0131985 A1 | 5/2013 | Weiland et al. | |
| 2014/0184550 A1 | 7/2014 | Hennessey et al. | |
| 2015/0049162 A1 | 2/2015 | Kurupacheril et al. | |
| 2015/0302422 A1 | 10/2015 | Bryson et al. | |
| 2015/0325008 A1* | 11/2015 | Scarff | G06T 11/001 |
| 2016/0012855 A1 | 1/2016 | Krishnan | |
| 2016/0088352 A1 | 3/2016 | Agarwal et al. | |
| 2016/0260196 A1 | 9/2016 | Roimela et al. | |
| 2016/0317930 A1 | 11/2016 | Nakayama | |
| 2016/0357255 A1 | 12/2016 | Lindh et al. | |
| 2017/0026577 A1 | 1/2017 | You | |
| 2017/0032575 A1 | 2/2017 | Yeoh et al. | |
| 2017/0039766 A1 | 2/2017 | Passmore et al. | |
| 2017/0109007 A1 | 4/2017 | Hurter | |
| 2017/0115626 A1 | 4/2017 | Wei | |
| 2017/0169602 A1 | 6/2017 | Blackmon et al. | |
| 2017/0188058 A1 | 6/2017 | Nakashima et al. | |
| 2017/0223395 A1 | 8/2017 | Elliot et al. | |
| 2017/0236162 A1 | 8/2017 | Christensen et al. | |
| 2017/0280166 A1 | 9/2017 | Walkingshaw et al. | |
| 2017/0285735 A1 | 10/2017 | Young et al. | |
| 2017/0287112 A1 | 10/2017 | Stafford et al. | |
| 2017/0287446 A1 | 10/2017 | Young et al. | |
| 2017/0289219 A1 | 10/2017 | Khalid et al. | |
| 2017/0293356 A1 | 10/2017 | Khaderi et al. | |
| 2017/0293947 A1 | 10/2017 | Singh | |
| 2017/0316806 A1 | 11/2017 | Warren et al. | |
| 2017/0318283 A1 | 11/2017 | Watson et al. | |
| 2017/0332064 A1 | 11/2017 | Martineau et al. | |
| 2017/0339341 A1 | 11/2017 | Zhou et al. | |
| 2017/0347084 A1 | 11/2017 | Boyce | |
| 2017/0371518 A1 | 12/2017 | Leppanen et al. | |
| 2018/0024724 A1 | 1/2018 | Patel et al. | |
| 2018/0054659 A1 | 2/2018 | Goswami | |
| 2018/0077345 A1 | 3/2018 | Yee | |
| 2018/0081178 A1 | 3/2018 | Shpunt | |
| 2018/0095542 A1 | 4/2018 | Mallinson | |
| 2018/0096494 A1 | 4/2018 | Zhou et al. | |
| 2018/0343387 A1 | 11/2018 | Bostick et al. | |
| 2019/0273864 A1 | 9/2019 | Bostick et al. | |
| 2019/0279015 A1 | 9/2019 | Lin et al. | |
| 2019/0356938 A1 | 11/2019 | Gopalan et al. | |
| 2019/0362537 A1 | 11/2019 | Xu | |
| 2019/0373326 A1 | 12/2019 | Han et al. | |
| 2020/0051321 A1 | 2/2020 | Xu et al. | |
| 2020/0380767 A1 | 12/2020 | Xu et al. | |
| 2021/0029408 A1 | 1/2021 | Han et al. | |

FOREIGN PATENT DOCUMENTS

| | | |
|---|---|---|
| WO | 2017087641 | 5/2017 |
| WO | 2017143128 A1 | 8/2017 |
| WO | 2017143289 A1 | 8/2017 |

OTHER PUBLICATIONS

Corbillon, Xavier et al., "Optimal Set of 360-Degree Videos for Viewport-Adaptive Streaming." in Proc. of ACM Multimedia (MM) (Oct. 23-27, 2017)., pp. 1-9.

Engestrom, Ulla, "Interactive 360 Degree Videos: A Demo for a New User Interface", http://blog.thinglink.com/marketing/interactive-360-degree-video, ThingLink—Bringing a New Dimension to the Visual Web, Oct. 9, 2015, 6 pages.

Facebook, "Facebook Now Lets You Guide Viewers Around Your 360-Degree Video", http://www.digitaltrends.com/social-media/facebook-360-video-tools-analytics/, 5 pages.

Grogorick, Steve et al., "Subtle Gaze Guidance for Immersive Environments", Proceedings of the ACM Symposium on Applied Perception, ACM 2017, Sep. 16-17, 2017, 7 pages.

Lin, Yung-Ta et al., "Outside-In: Visualizing Out-of-Sight Regions-of-Interest in a 360 Video Using Spatial Picture-in-Picture Previews", UIST 2017, Oct. 22-25, 2017, Quebec City, QC, Canada Copyright c 2017 Association for Computing Machinery. ACM ISBN 978-1-4503-4981-9/17/10$15.00 https://doi.org/10.1145/3126594.3126656, Oct. 2017, 11 pages.

Lisnevska, Alina, "360-Degree Video Creation—Strategies to Consider", Sep. 6, 2017, 7 pages.

Sheikh, Alia et al., "Directing Attention in 360-Degree Video", BBC Research and Development, UK, 2016, 9 pages.

Veas, Eduardo et al., "Directing Attention and Influencing Memory With Visual Saliency Modulation", Proceedings of the SIGCHI Conference on Human Factors in Computing Systems, ACM, 2011, 10 pages.

* cited by examiner

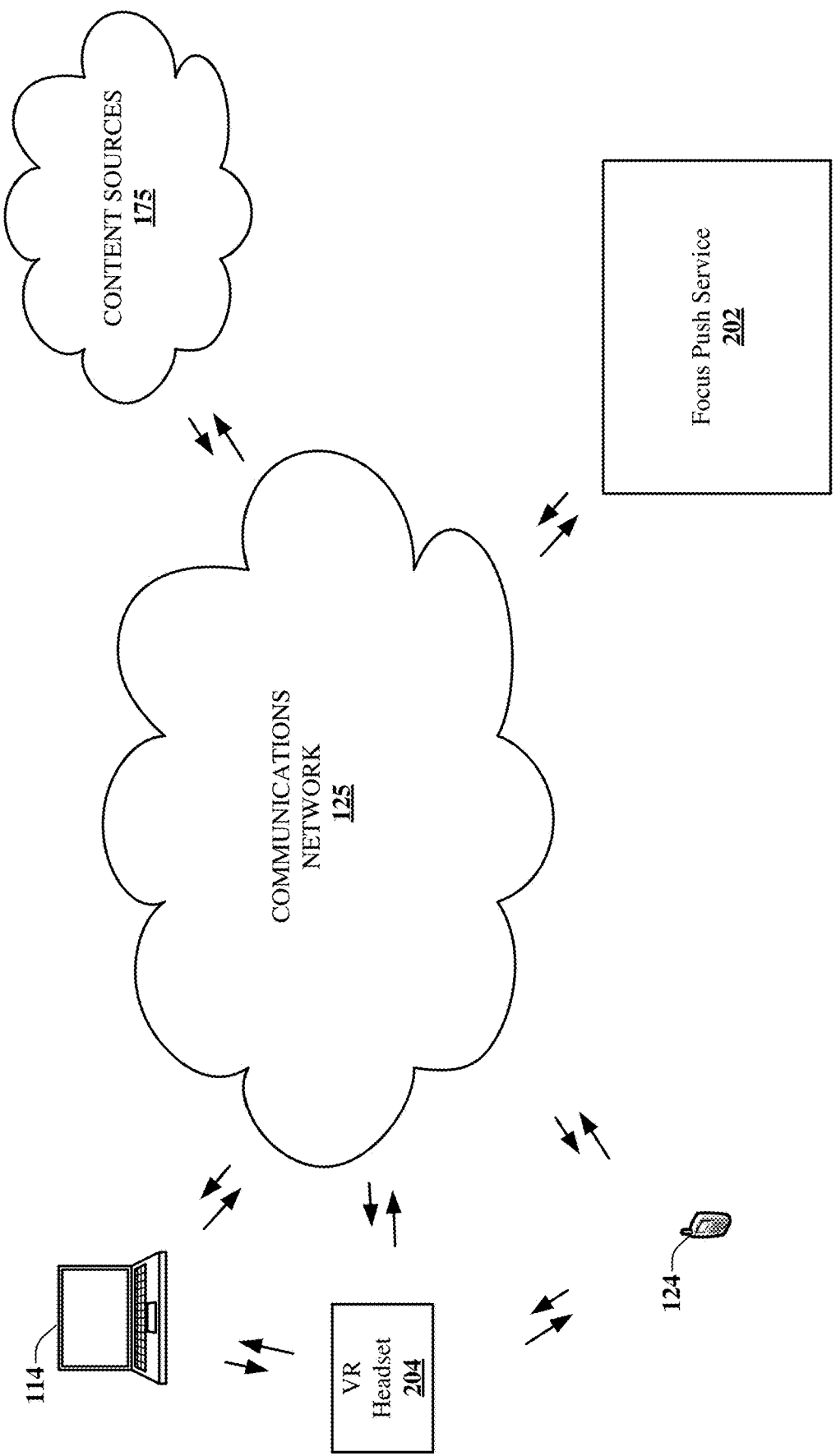

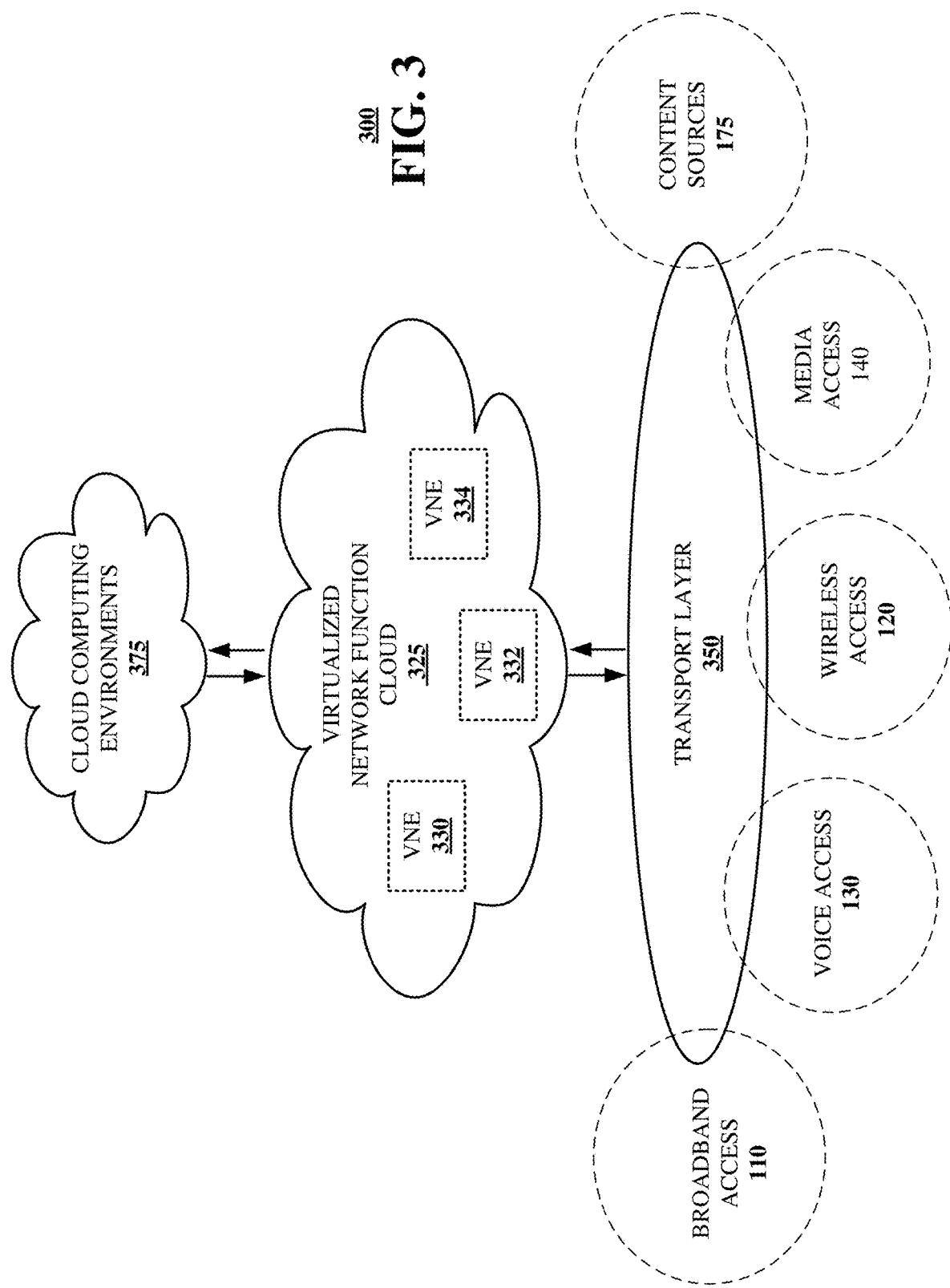

DIRECTING USER FOCUS IN 360 VIDEO CONSUMPTION

CROSS-REFERENCE TO RELATED APPLICATIONS

This application is a continuation of U.S. patent application Ser. No. 15/982,300 filed May 17, 2018, now issued as U.S. Pat. No. 10,721,510. The contents of each of the foregoing are hereby incorporated by reference into this application as if set forth herein in full.

FIELD OF THE DISCLOSURE

The subject disclosure relates to a system and method for directing user focus in media content, such as 360 degree video

BACKGROUND

Some media content is becoming more and more feature rich, such that users can easily become overwhelmed. For example, in 360 degree video, users may miss portions that may be of interest to them, merely because they were looking the wrong way.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
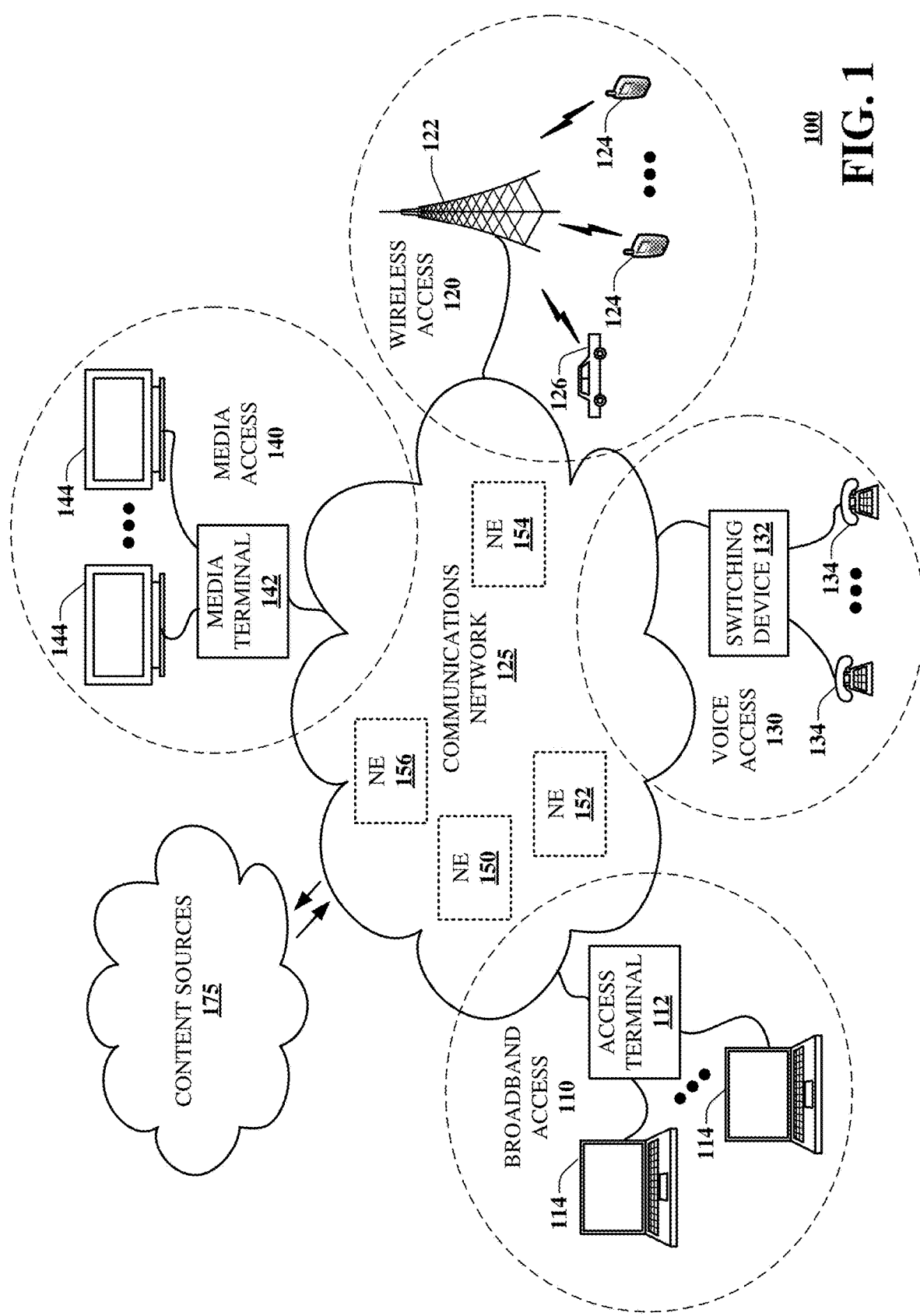
FIG. 1 is a block diagram illustrating an example, non-limiting embodiment of a communications network in accordance with various aspects described herein.

The subject disclosure describes, among other things, illustrative embodiments for directing a user's attention as they consume media content. Other embodiments are described in the subject disclosure.

One or more aspects of the subject disclosure include a method including obtaining media content and an identification of a plurality of points of interest in the media content, receiving a request from a user to view the media content, obtaining information about the user, identifying one or more highlight and/or degrade points based on the information about the user, modifying the media content to create highlighted content, the highlighted content being the media content modified to attract attention of the user to the highlight point and drive the attention of the user away from the degrade point, presenting the highlighted content to the user, and monitoring the user's consumption of the content.

One or more aspects of the subject disclosure include a method comprising: obtaining media content; analyzing the media content to discern a plurality of points of interest in the media content; receiving a request from a user to view the media content; obtaining information about the user; identifying one or more highlight points by determining which of the points of interest in the media content would be of interest to the user based on the information about the user; creating highlighted content, which is the media content modified to draw attention of the user to the highlight point therein; presenting the highlighted content to the user; monitoring the user's consumption of the highlighted content to ascertain which of the points of interest drew the attention of the user; and updating, the information about the user and the analysis of the media content based on the points of interest that drew the attention of the user.

One or more aspects of the subject disclosure include an apparatus, comprising: a processor and a memory that stores executable instructions that, when executed by the processor, facilitate performance of operations, including: obtaining media content and an identification of a plurality of points of interest in the media content; receiving a first request from a first user to view the media content; obtaining information about the first user; identifying a first set of highlight points by determining which of the points of interest in the media content would be of interest to the first user based on the first information; creating first highlighted content, which is the media content modified to draw attention of the first user to the first set of highlight points therein; receiving a second request from a second user to view the media content; obtaining second information about the second user; identifying a second set of highlight points by determining which of the points of interest in the media content would be of interest to the second user based on the second information; creating second highlighted content, which is the media content modified to draw attention of the second user to the second set of highlight points therein; presenting the first highlighted content and the second highlighted content to the respective users; tracking the users' lines of sight; and updating the information about the users based on the tracking.

One or more aspects of the subject disclosure include A non-transitory, machine-readable medium, comprising executable instructions that, when executed by a processing system including a processor, facilitate performance of operations, the operations comprising: obtaining media content and an identification of a plurality of points of interest in the media content; receiving a request from equipment of a user to view the media content; obtaining information about the user; identifying one or more highlight points and degrade points based on the information about the user; creating highlighted content, which is the media content modified to attract attention of the user to the highlight points and drive the attention of the user away from the degrade points; presenting the highlighted content to the user; tracking a line of sight of the user; and updating the information based on the tracking the line of sight.

Referring now to FIG. 1, a block diagram is shown illustrating an example, non-limiting embodiment of a communications network 100 in accordance with various aspects described herein. As will be apparent below, the communications network 100 may form part of, or may support, certain embodiments of the focus push service described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within the communication network of FIG. 1 in accordance with various aspects described herein. A focus push service 202 of the disclosed embodiments obtains media content, such as from the content source 175 through the communications network 125. The focus push service 202 analyzes the content in an effort to determine where a user's attention should be directed within the content. When a user requests the content, the focus push service 202 may create and provide highlighted content directing the user to portions of the content that may be of interest to that user, as will be discussed in greater detail below. The focus push service 202 may obtain the media content before or after receiving a user request for the content. The user may interact with the focus push service 202 through a variety of devices, such as the data terminal 114, the mobile device 124, Virtual Reality (VR) headset 204, other equipment, and/or any combination thereof. For example, the focus push service 202 may communicate directly with the VR headset 204, through the communications network 125, and/or through the data terminal 114, the mobile device 124, other equipment, and/or any combination thereof.

Figure 2B:
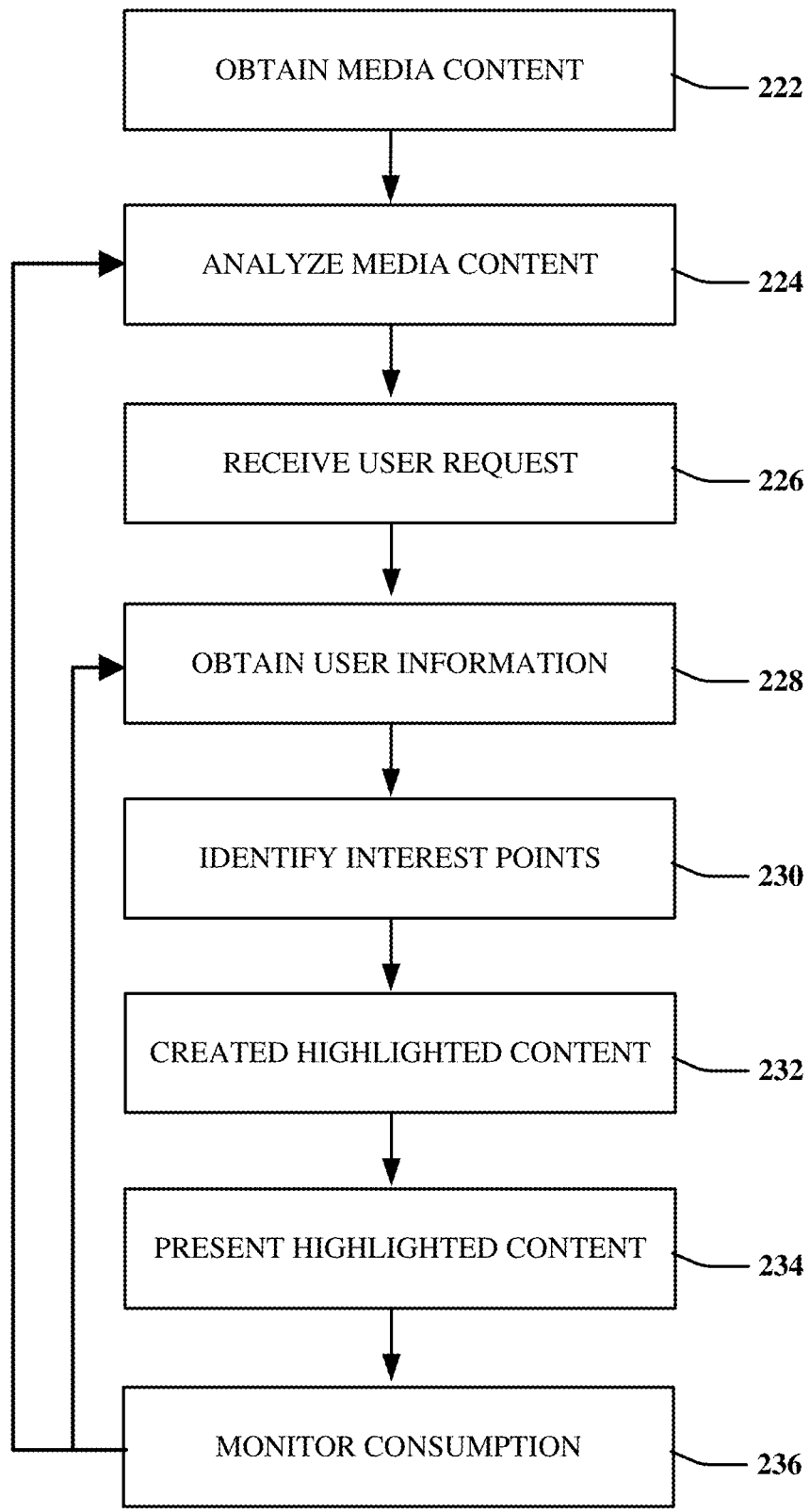
FIG. 2B depicts an illustrative embodiment of a method in accordance with various aspects described herein.

FIG. 2B depicts an illustrative embodiment of a method 220 in accordance with various aspects described herein. As shown in 222, the focus push service 202 obtains media content, such as from the content source 175 through the communications network 125. The media content may be 360 degree video, three-dimensional video, panoramic video, immersive video, volumetric video, other media content, and/or a combination thereof.

As shown in 224, the focus push service 202 may analyze the media content to discern a plurality of points of interest in the media content. This analysis may include scoring each of the points of interest in the media content. For example, the focus push service 202 may have monitored previous users' consumption of the media content, tracking their field of view and/or actual gaze, and therefore determined where those previous user's looked within the media content. Thus, the scoring may comprise a tally of how often previous users have looked at a particular point of interest in the media content.

The tally itself can be used to identify further points of interest. For example, if users frequently look at the same point, or spot, in the media content, that point may be identified as a possible point of interest. The more often previous users have looked at a particular point, the more likely it may be a point of interest for future users. Thus, not only can the tally be used in the scoring of points of interest, the tally may also be used to identify points of interest.

The focus push service 202 itself may perform the analysis. In some embodiments, another element performs the analysis and/or identifies points of interest in the media content. For example, the content source 175 may provide the points of interest along with the media content. In any case, the identification of the points of interest may evolve as more users view the media content, as will be discussed in more detail below.

As shown in 226, the focus push service 202 may receive or otherwise obtain a user request for the media content. Such a request may be received before or after the focus push service 202 has obtained and/or initially analyzed the media content. For example, the focus push service 202 may obtain access to the media content, but wait for a user request to actually analyze it, thereby conserving resources.

As shown in 228, the focus push service 202 may also obtain information about the user. This information may include demographic information about the user, such as age, gender, etc. This information may include user preferences and/or user viewing habits.

As shown in 230, the focus push service 202 may identify one or more highlight points in the media content. It should be noted that the highlight points need not be specific points, but rather may be areas or other portions of the media content to which the user's attention is drawn. In some embodiments, the highlight points may be points of interest that are likely to be of interest to the user, based on the analysis and information about the user. For example, in some embodiments, a point of interest that is viewed by the most previous users may be considered likely to be of interest to any future users.

In some embodiments, the demographic information about the user may be taken into account. For example, a point of interest that is frequently viewed by previous users sharing similar demographics with the user may be considered likely to be of interest to the user. More specifically, where the user is young male, they may not be interested in points of interest viewed by one hundred adult females. Rather, where the user is young male, they may be more interested in points of interest viewed by twenty young males (as opposed to one hundred adult females). Thus, the focus push service 202 may account for both the initial analysis as well as specific information about the user in order to determine which of the points of interest in the media content would be of interest to a specific user, thereby identifying the highlight points.

The focus push service 202 may also identify one or more degrade points in the media content. It should be noted that the degrade points need not be specific points, but rather may be areas or other portions of the media content from which the user's attention is drawn. For example, one or more of the points of interest may correspond to a subject matter that conflicts with the information about the user. In some embodiments, points of interest may be inappropriate or uninteresting for certain users. Those points of interest would not be identified as highlight points and may even be identified as degrade points from which the user's attention may be steered.

User preferences may also be used to supplement, replace, and/or override the demographic information and/or other information about the user. For example, a specific user may be interested in things similarly situated users may not be. As such, that user can override normal demographic processing. As another example, user preferences (possibly in the form of parental controls) may be used to ensure certain users are not exposed to inappropriate material. In some embodiments, user preferences may be used to specify topics or subject matter that a specific user is or is not interested in.

Similarly, a user's actual viewing habits may be used to enhance, update, or even correct the information about a user. For example, a user may specify that they are interested in a specific subject, such as in user preferences. The service 202, or another portion of the system, may notice over time that they tend to not pay much attention to certain points of interest highlighted due to matching that specific subject. The service 202 may update the information about the user, such as by refining the subject further, or applying less weight to the specific subject in determining which points of interest may be of interest to the user.

Similarly, in some cases, the service 202 may determine over time that a user tends to pay more attention to certain points of interest, that were not otherwise flagged as being points of interest likely to be of interest to the user. Here again, the service 202 may update the information about the user, such as by applying more weight to a specific subject in determining which points of interest may be of interest to the user.

In one embodiment, points of interest may have been included by the content creator and initially received with the content, as shown in 222. For example, these interest points can be encoded in a second channel either visually or as non-visual metadata. Such metadata can then be utilized in subsequent steps where the originally created points of interest are directly used or modified by the methods described herein.

As shown in 232, the focus push service 202 may modify the media content, or otherwise create highlighted content to draw the user's attention to the highlight points and/or away from the degrade points. In some embodiments, the highlighted content may comprise the media content or only a portion thereof. In some embodiments, the highlighted content may comprise the media content with the highlight point, or a portion surrounding the highlight point, being presented in a higher resolution than the remainder of the media content. Similarly, in some embodiments, the highlighted content may comprise the media content with the degrade point, or a portion surrounding the degrade point, being presented in a lower resolution than the remainder of the media content.

Other techniques may also be used to direct the user's attention. For example, the highlight point, or a portion surrounding the highlight point, may be presented brighter than the remainder of the media content. Similarly, degrade point, or a portion surrounding the degrade point, may be presented dimmer than the remainder of the media content. As another example, the highlight point, or a portion surrounding the highlight point, may be presented with louder audio content than the remainder of the media content. Similarly, degrade point, or a portion surrounding the degrade point, may be presented quieter audio content than the remainder of the media content. These and/or other techniques may be used, such as other environment manipulation, generated audio or textual signal based on the scene, visual (flash), haptic (wind, touch, temperature, etc.) to guide the user's attention.

As shown in 234, the focus push service 202 then presents the highlighted content to the user. In some embodiments, the focus push service 202 may present the highlighted content to the user's equipment or device(s). For example, the focus push service 202 may present the highlighted content to the user's VR headset 204, the data terminal 114, the mobile device 124, other equipment, and/or any combination thereof. That device may then present the highlighted content to the user.

As shown in 236, the focus push service 202 may monitor the user's consumption of the media content. In some embodiments, the system monitors the position and orientation of the user's VR headset 204. In some embodiments, the system monitors an actual view through a device. For example, rather than merely monitoring the position and orientation of the user's VR headset 204, the focus push service 202 may monitor the user's actual line of sight or gaze. More specifically, depending upon the hardware used, the focus push service 202 may actually monitor the user's eyes and discern where the user is actually looking, rather than just where their head (or VR headset 204) is pointing. This may be done, for example, by detecting reflections from the user's eyes, or monitoring images of the user's eyes, and determining therefrom which direction the user is looking, which may be relative to (but different from) orientation of the user's VR headset 204.

In presenting the highlighted content to the user, the focus push service 202 may also enhance the portion of the media content at which the user is actually looking, whether or not that portion corresponds to the highlight (or degrade) points. For example, the portion of the media content at which the user is actually looking may be presented in a higher resolution, greater brightness, or louder audio, etc. By presenting the remainder of the media content at lower resolution/brightness/audio, for example, the system may conserve network bandwidth and/or data usage.

As shown, and discussed above, the focus push service 202 knows where it wants the user to look, for example, and where the user is actually looking. To the extent these two correlate, the identification of the points of interest, highlight points, and degrade points, as well as the information about the user, may be considered accurate. Otherwise, the identification of the points of interest, highlight points, and degrade points, as well as the information about the user may be updated, enhanced, or otherwise supplemented, based on where the user is actually looking as compared to where the focus push service 202 wants the user to look.

For example, as discussed above, where users actually look may be used to further identify possible points of interest. Similarly, if users typically linger at certain points of interest, then those points may be given more weight when identifying highlight points. On the other hand, if users typically avoid certain points of interest, then those points may be given less weight when identifying highlight points.

All of this analysis may be done specific to the user. For example, as the user uses the system, the system may continually learn more about that user's true interests, which may then be used to improve selection of highlight points (and degrade points). This may also be done on the fly. For example, where the focus push service 202 identifies highlight points in the media content based on information then known about the user (or in the absence of such information), the focus push service 202 monitors the user's actual consumption on the highlighted content, and may more accurately identify highlight points in later portions of that same media content.

The focus push service 202 may perform the above processes on the same or different media content for multiple users, such that each user experience is different. For example, the focus push service 202 may present the same media content to two different users with different highlight points and/or different degrade points. The focus push service 202 may do so simultaneously and/or using the same equipment. For example, where two users are utilizing the same terminal 114, possibly with two separate VR headsets 204, the focus push service 202 may present two different versions of the highlighted content to the terminal 114, for distinct presentation through the two VR headsets 204.

In one embodiment, the focus push service 202 may send focus information back to a content source 175. This content source 175 can then use this additional information to optimize encoding of the content and/or include some of the created highlight content 232 as part of the original content instead of relying on the focus push service 202 for an additional processing as described herein, such as modifying the media content, and/or otherwise creating highlighted content.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 220 presented in FIGS. 1, 2A, and 2B3. For example, the virtualized communication network may form part of, or may support, certain embodiments of the focus push service described herein.

In particular, a cloud networking architecture is shown that leverages cloud technologies and supports rapid innovation and scalability via a transport layer 350, a virtualized network function cloud 325 and/or one or more cloud computing environments 375. The virtualized network function cloud 325 and/or one or more cloud computing environments 375 may perform the above described operations of the focus push service 202. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
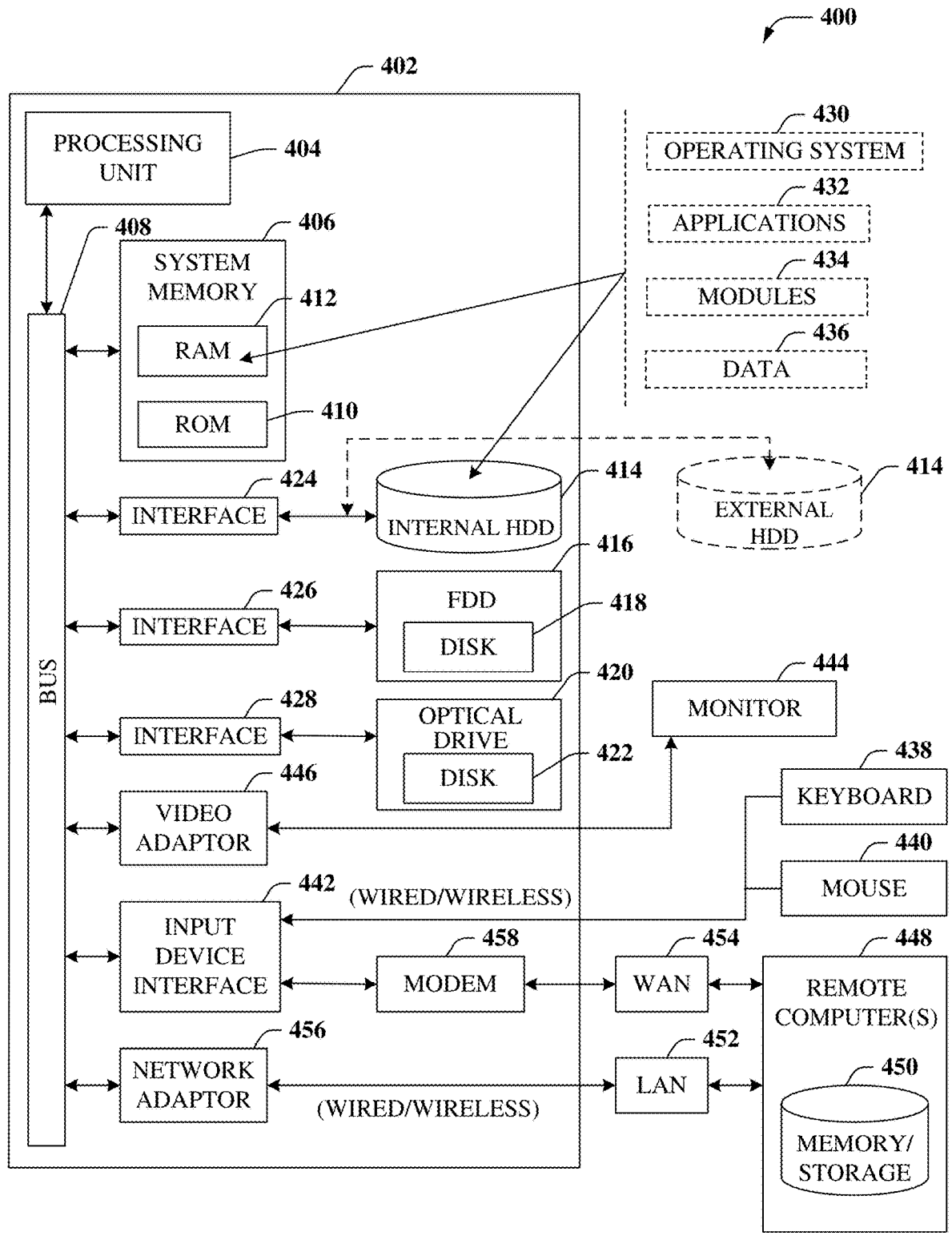
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. The computing environment 400 can be used in the implementation of the focus push service 202 and/or user devices. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
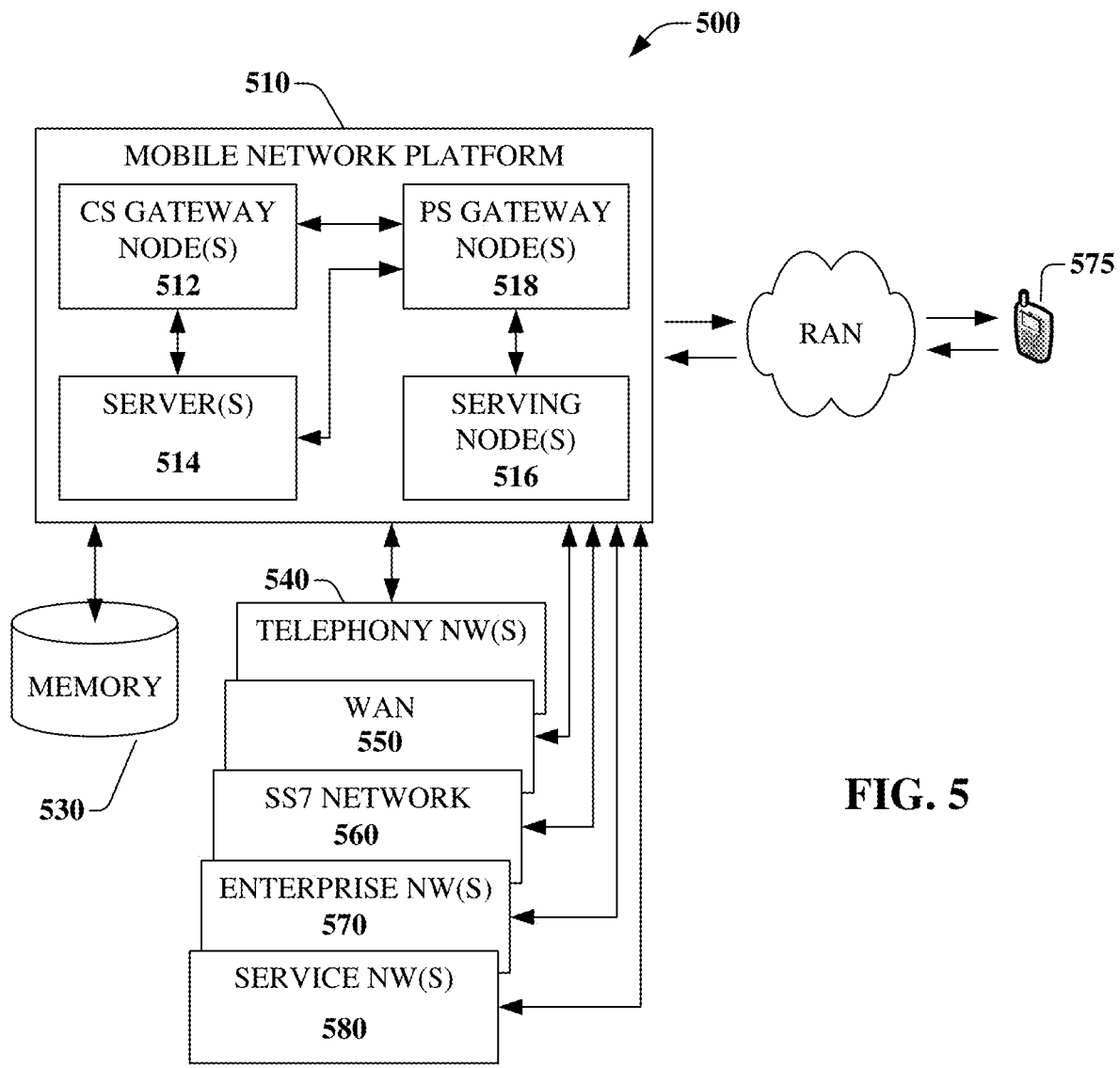
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. As such, the mobile network platform 510 may facilitate communications between the user's devices and the focus push service 202.

Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
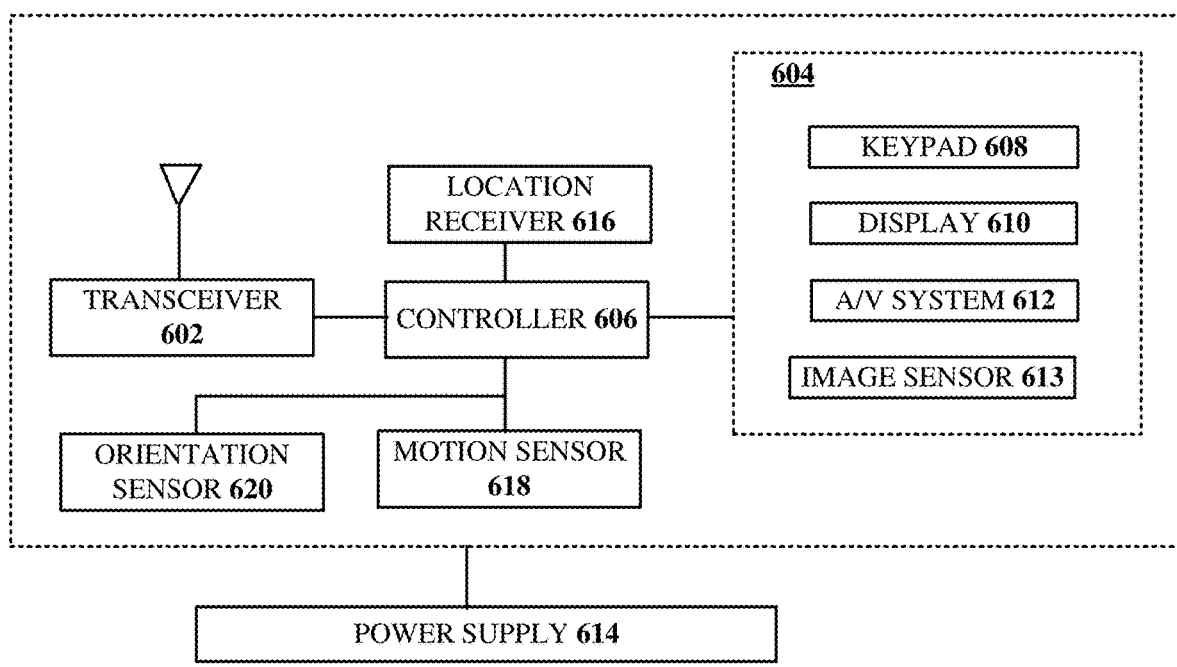
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144, VR headset 204, or other client (or user) devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Figure 7:
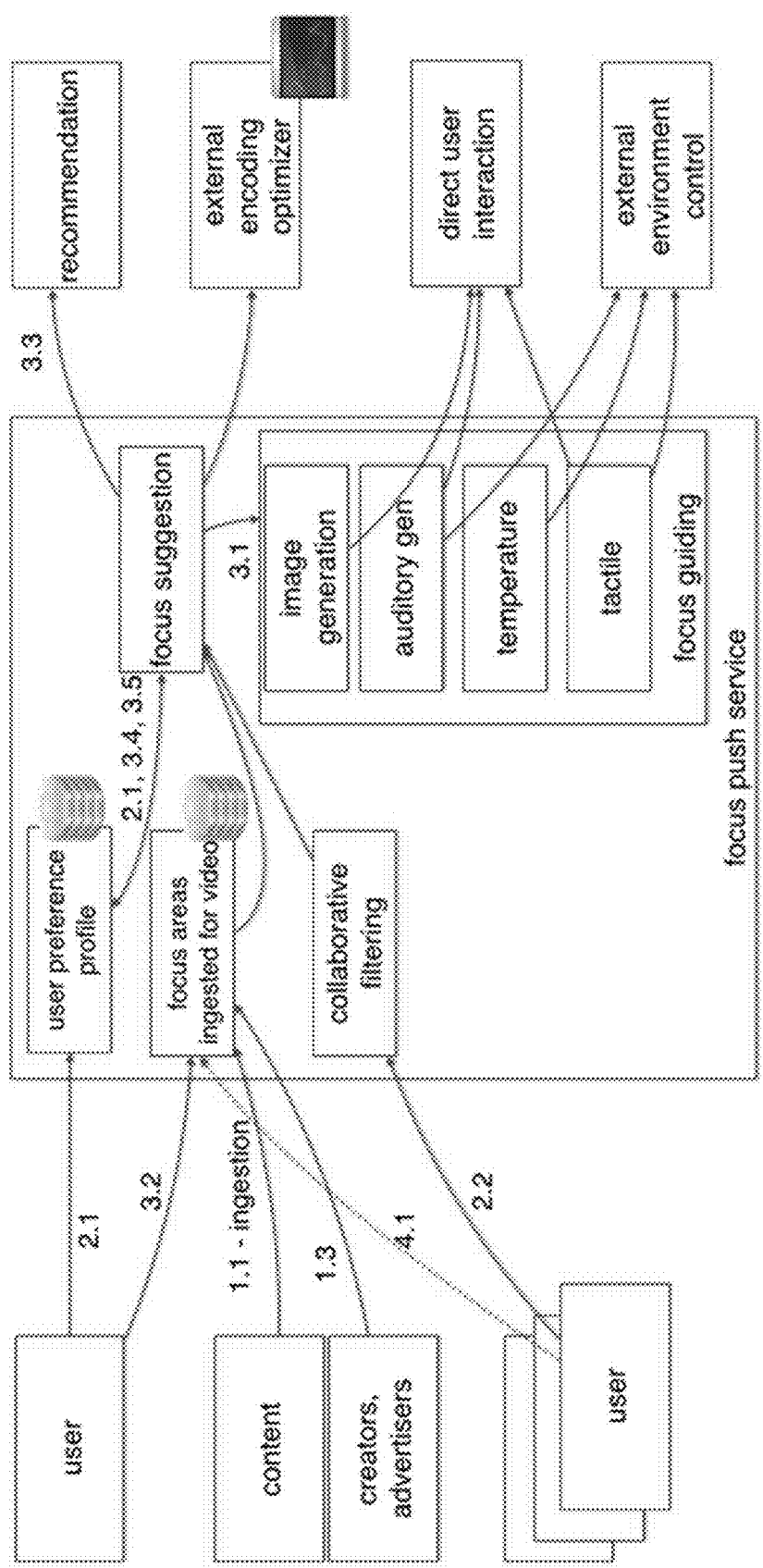
FIG. 7 is a block diagram of an example, non-limiting embodiment of a system environment in accordance with various aspects described herein.

Referring now to FIG. 7, a block diagram is shown illustrating an example, non-limiting embodiment of system 700 that may include the focus push service 202 in accordance with various aspects described herein, showing various functions thereof and interactions therewith. As described above, the system 700 guides a user to a focus point, or point of interest.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc. In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
obtaining, by a processing system having a processor, an identification of a plurality of points of interest in media content;
identifying, by the processing system, a highlight point corresponding to a first portion of the plurality of points of interest in the media content likely to be of interest to a user based on information about the user;
identifying, by the processing system, a degrade point corresponding to a second portion of the plurality of points of interest conflicting with the information about the user;
modifying, by the processing system, the media content, according to the highlight point and the degrade point, to create highlighted content to draw attention of the user to the highlight point and to drive attention of the user away from the degrade point;
presenting, by the processing system, the highlighted content at equipment of the user;
monitoring, by the processing system, a consumption by the user of the highlighted content at the equipment of the user; and
updating, by the processing system, the information about the user based on the monitoring the consumption by the user of the highlighted content at the equipment of the user.

2. The method of claim 1, further comprising analyzing, by the processing system, the media content to determine the plurality of points of interest in the media content, wherein the analyzing results in scoring each of the points of interest in the media content.

3. The method of claim 2, further comprising updating, by the processing system, the scoring of the points of interest in the media content based on which of the points of interest drew the attention of the user.

4. The method of claim 1, further comprising receiving, by the processing system, a request from equipment of the user to view the media content.

5. The method of claim 1, further comprising obtaining, by the processing system, information about the user.

6. The method of claim 1, wherein the monitoring the consumption of the user of the highlighted at the equipment of the user further comprises identifying, by the processing system, a third portion of the points of interest drawing the attention of the user.

7. The method of claim 1, wherein the modifying the media content to create the highlighted content further comprises decreasing, by the processing system, a resolution of a portion of the media content corresponding to the second portion of the plurality of the points of interest that conflicts with the information about the user.

8. The method of claim 1, wherein the modifying the media content to create the highlighted content further comprises increasing, by the processing system, a resolution of the highlight point.

9. The method of claim 1, wherein the presenting the highlighted content further comprises:
presenting, by the processing system, the media content to the equipment of the user with a first resolution corresponding to the highlight point; and
presenting, by the processing system, the media content to the equipment of the user with a second resolution corresponding to a line of sight of the user.

10. The method of claim 9, wherein the line of sight of the user is indicative of where the user is looking and not dependent on an orientation of the equipment of the user.

11. The method of claim 9, wherein the monitoring the consumption by the user of the highlighted content further comprises:
tracking, by the processing system, the line of sight of the user;

comparing, by the processing system, the line of sight of the user with the highlight point; and analyzing, by the processing system, a proportion of time the line of sight of the user corresponds with the highlight point.

12. An apparatus, comprising:

a processor; and a memory that stores executable instructions that, when executed by the processor, facilitate performance of operations, comprising:

obtaining an identification of a plurality of points of interest in media content;

identifying a highlight point corresponding to a first portion of the plurality of points of interest in the media content likely to be of interest to a user based on information about the user;

identifying a degrade point corresponding to a second portion of the plurality of points of interest conflicting with the information about the user;

modifying the media content, according to the highlight point and the degrade point, to create highlighted content to draw attention of the user to the highlight point and to drive attention of the user away from the degrade point;

presenting the highlighted content at equipment of the user;

monitoring a consumption by the user of the highlighted content at the equipment of the user; and updating the information about the user based on the monitoring the consumption by the user of the highlighted content at the equipment of the user.

13. The apparatus of claim 12, wherein the operations further comprise: receiving a request from equipment of the user to view the media content, wherein the presenting the highlighted content at the equipment of the user is responsive to the receiving the request.

14. The apparatus of claim 12, wherein the operations further comprise:

analyzing the media content to determine the plurality of points of interest in the media content, wherein the analyzing results in scoring each of the points of interest in the media content; and updating the scoring of the points of interest in the media content based on which of the points of interest drew the attention of the user.

15. The apparatus of claim 12, wherein the modifying the media content to create the highlighted content further comprises decreasing a resolution of a portion of the media content corresponding to the second portion of the plurality of the points of interest that conflicts with the information about the user.

16. The apparatus of claim 12, wherein the modifying the media content to create the highlighted content further comprises increasing a resolution of the media content corresponding to the highlight point.

17. A non-transitory machine-readable medium, comprising executable instructions that, when executed by a processing system including a processor, facilitate performance of operations, the operations comprising:

obtaining an identification of a plurality of points of interest in media content;

identifying a highlight point corresponding to a first portion of the plurality of points of interest in the media content likely to be of interest to a user based on information about the user;

identifying a degrade point corresponding to a second portion of the plurality of points of interest conflicting with the information about the user;

modifying the media content, according to the highlight point and the degrade point, to create highlighted content to draw attention of the user to the highlight point and to drive attention of the user away from the degrade point;

presenting the highlighted content at equipment of the user;

monitoring a consumption by the user of the highlighted content at the equipment of the user; and updating the information about the user based on the monitoring the consumption by the user of the highlighted content at the equipment of the user.

18. The non-transitory machine-readable medium of claim 17, wherein the monitoring the consumption by the user of the highlighted content further comprises:

tracking a line of sight of the user;

comparing the line of sight of the user with the highlight point; and analyzing a proportion of time the line of sight of the user corresponds with the highlight point.

19. The non-transitory machine-readable medium of claim 17, wherein the operations further comprise analyzing the media content to determine the plurality of points of interest in the media content, wherein the analyzing results in scoring each of the points of interest in the media content.

* * * * *